(12) United States Patent
Bose et al.

(10) Patent No.: US 8,448,248 B2
(45) Date of Patent: May 21, 2013

(54) APPARATUS AND METHOD FOR REPAIRING COMPUTER SYSTEM INFECTED BY MALWARE

(75) Inventors: Abhijit Bose, Ann Arbor, MI (US); Taejoon Park, Seoul (KR); Kang Geun Shin, Ann Arbor, MI (US); Xin Hu, Ann Arbor, MI (US)

(73) Assignees: Samsung Electronics Co., Ltd., Suwon-si (KR); The Regents of the University of Michigan, Ann Arbor ( * ) Notice: Subject to any disclaimer, the term of this patent is extended or adjusted under 35 U.S.C. 154(b) by 862 days.

(21) Appl. No.: 12/056,236

(22) Filed: Mar. 26, 2008

(65) Prior Publication Data
US 2009/0031162 A1    Jan. 29, 2009

Related U.S. Application Data

(60) Provisional application No. 60/951,301, filed on Jul. 23, 2007.

(30) Foreign Application Priority Data

Oct. 4, 2007    (KR) .................. 10-2007-0099978

(51) Int. Cl.
*G06F 11/00* (2006.01)
(52) U.S. Cl.
USPC ............... 726/24; 726/22; 726/23; 726/25; 713/188

(58) Field of Classification Search
USPC ........... 726/22, 23, 24, 25; 713/188; 709/224, 709/229
See application file for complete search history.

(56) References Cited

U.S. PATENT DOCUMENTS

| 2003/0101381 A1 | 5/2003 | Mateev et al. |
| 2005/0187740 A1 | 8/2005 | Marinescu |
| 2006/0174344 A1* | 8/2006 | Costea et al. .................. 726/24 |
| 2007/0240222 A1* | 10/2007 | Tuvell et al. .................. 726/24 |

FOREIGN PATENT DOCUMENTS

| KR | 10-2006-0020397 | 3/2006 |
| KR | 10-2007-0007602 | 1/2007 |

* cited by examiner

*Primary Examiner* — Edward Zee
*Assistant Examiner* — Baotran N To
(74) *Attorney, Agent, or Firm* — NSIP Law

(57) ABSTRACT

An apparatus and method of diagnosing whether a program executed in a computer system is malware and repairing the computer system infected by malware. The apparatus includes a receiving unit which receives a first behavior vector for the malware from a malware control server; a determination unit which determines whether a diagnostic target program corresponds to malware based on the received first behavior vector and a second behavior vector for the diagnostic target program; and a repair unit which repairs the computer system based on a result of the determination.
A behavior of a computer program executed in the computer system may be modeled in real time.

10 Claims, 8 Drawing Sheets

APPARATUS AND METHOD FOR REPAIRING COMPUTER SYSTEM INFECTED BY MALWARE

CROSS-REFERENCE TO RELATED APPLICATIONS

This application claims priority from U.S. Provisional Application No. 60/951,301 filed on Jul. 23, 2007 in the U.S. Patent and Trademark Office, and Korean Patent Application No. 10-2007-0099978 filed on Oct. 4, 2007 in the Korean Intellectual Property Office, the entire disclosure of both of which are incorporated herein by reference.

TECHNICAL FIELD

The following description relates to an apparatus and method of diagnosing whether a program executed in a computer system is malware and repairing the computer system infected by malware.

BACKGROUND

Conventional malware detection technology collects samples of malware available to date, extracts a certain character string that is the signature of malware from the collected samples, and determines whether a particular computer is infected with malware depending on the existence of the extracted character string in files of a diagnostic target computer system, and the like.

Therefore, when new malware is discovered, an apparatus for repairing malware must be developed to identify the nature of the new malware, extract a predetermined character string that is the signature of the new malware, and detect malware. The existing apparatus for repairing malware may not detect the new malware before information about malware is added and thus damage from the new malware may not be prevented. Also, the types of character strings that are the signatures of malware increase in proportion to the increase in the types of malware. Therefore, it takes more time to detect the existence of the character strings that are the signatures of malware.

For example, in the case of a mobile device that is supplied with power using a battery and the like, such as a mobile phone, a personal digital assistant (PDA), and the like, the mobile device consumes power to extract a character string from a particular computer program and verify whether the extracted character string is the same as a character string corresponding to the signature of conventional malware. Due to the power consumption, time available to run the mobile device is inevitably reduced.

Also, according to a conventional art, if a hacker's attacks reveal a vulnerability of a computer, a program manufacturer may guard against the hacker's attacks using a patch program that corrects the vulnerability. However, there are no distinct solutions for other attacks on the underlying vulnerabilities.

Most malware are not new programs that differ from existing malware, but most malware correspond to variants of the existing malware, and behave in a similar manner as the existing malware. However, in order to detect the variants of the malware, a new character string that is extracted from each variant must be used instead of a character string that is extracted from the existing malware. Therefore, a plurality of character strings must be provided to detect a plurality of variants respectively.

SUMMARY OF THE INVENTION

In one general aspect, an apparatus and method of repairing a computer system infected by malware can model a behavior of a computer program executed in the computer system in real time, and determine whether the computer program corresponds to malware.

In another general aspect, an apparatus and method of repairing a computer system infected by malware can repair the computer system based on a system control signal received from a malware control server, and prevent malware from being spread when it is determined that a diagnostic target program corresponds to malware.

According to another general aspect, an apparatus for repairing a computer system infected by malware includes: a receiving unit which receives a first behavior vector for malware from a malware control server; a determination unit which determines whether a diagnostic target program corresponds to malware based on the received first behavior vector and a second behavior vector for the diagnostic target program; and a repair unit which repairs the computer system based on a result of the determination.

According to another general aspect, a method of repairing a computer system infected by malware includes: receiving a first behavior vector for malware from a malware control server; determining whether a diagnostic target program corresponds to malware based on the received first behavior vector and a second behavior vector for the diagnostic target program; and repairing the computer system based on a result of the determination.

According to still another general aspect, an apparatus and method of repairing a computer system infected by malware can model a behavior of a computer program executed in the computer system in real time, and determine whether the computer program corresponds to malware.

Also, according to a further general aspect an apparatus and method of repairing a computer system infected by malware can repair the computer system based on a system control signal received from a malware control server, and prevent malware from being spread when it is determined that a diagnostic target program corresponds to malware.

Other features will become apparent to those skilled in the art from the following detailed description, which, taken in conjunction with the attached drawings, discloses exemplary embodiments of the invention.

DETAILED DESCRIPTION

The following detailed description is provided to assist the reader in understanding the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
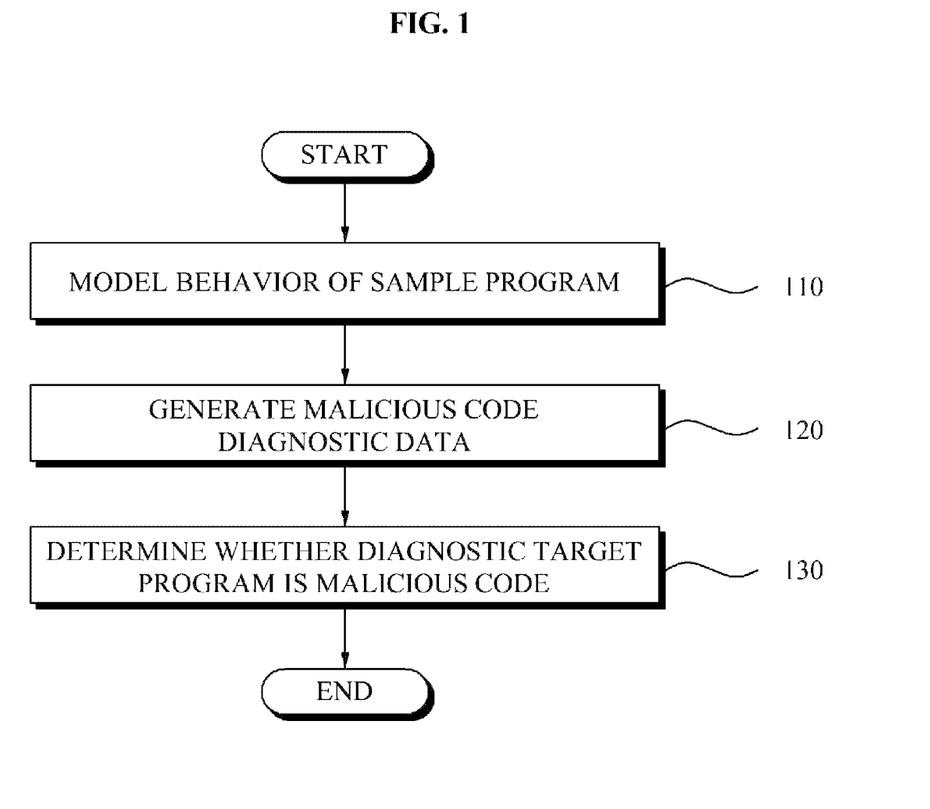
FIG. 1 is a flowchart illustrating a method of detecting malware by using a behavior of a computer program.

FIG. 1 is a flowchart illustrating a method of detecting malware by using a behavior of a diagnostic target program. Hereinafter, the method of detecting malware is described in detail with reference to FIG. 1.

The term "malware" or "malicious code" denotes programs with malicious intent that are created to intentionally cause damage to user data, and all types of executable programs that may operate on a computer system, such as a macro, a script, and the like.

The term "computer system" denotes electronic devices including a central processing unit (CPU) and a memory. Specifically, the electronic devices include various types of electronic devices such as a personal computer (PC), a notebook PC, a mobile phone, a Personal Digital Assistant (PDA), a navigation device, a digital camera, a Portable Multimedia Player (PMP), and the like.

In operation 110, a behavior of a predetermined sample program is modeled to determine whether the sample program is malicious. In operation 110, a behavior vector may be generated by modeling the behavior of the sample program. The sample program includes malware and a normal program.

In operation 120, malicious code diagnostic data is generated using the generated behavior vector. The malicious code diagnostic data may include a weight vector and a threshold value.

In operation 130, whether a diagnostic target program is a malicious code is determined using the behavior vector generated from the diagnostic target program. An entire behavior vector space is classified into a normal behavior vector space and a malicious behavior vector space using the malicious code diagnostic data and the behavior vector generated from the sample program. When the behavior vector generated from the diagnostic target program is located in the normal behavior vector space, the diagnostic target program may be determined to be a normal program, and when the behavior vector generated from the diagnostic target program is located in the malicious behavior vector space, the diagnostic target program may be determined to be malware.

Also, behaviors of most malware are similar in that malware invades a user's computer system and deletes/alters data of the user, such as system files, and the like to destroy the computer system.

Accordingly, when using the behavior of the diagnostic target program to determine whether the diagnostic target program is either normal or malicious, the malware may be more accurately detected in comparison to the existing method of comparing character strings. Also, even in the case of an unknown new variant, it is possible to determine whether the particular computer program is malicious using the behavior.

It is unnecessary to analyze information about the new malware. Accordingly, it is possible to reduce damages that may occur while analyzing the new malware.

Figure 2:
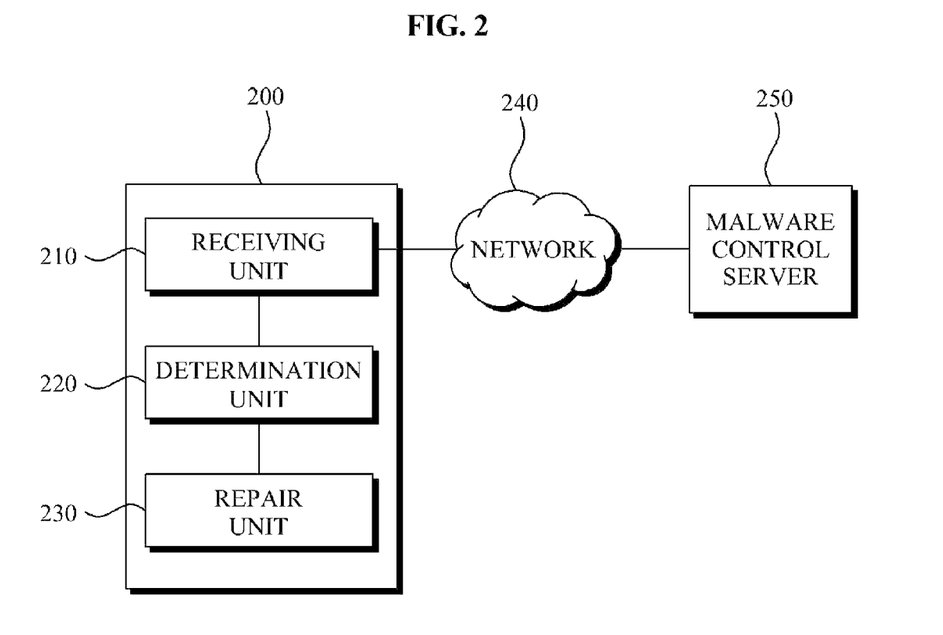
FIG. 2 is a diagram illustrating a structure of an apparatus for repairing a computer system infected by malware.

FIG. 2 is a diagram illustrating a structure of an apparatus 200 for repairing a computer system infected by malware. Hereinafter, the structure of the apparatus 200 for repairing the computer system infected by malware is described in detail with reference to FIG. 2. The apparatus 200 for repairing the computer system infected by malware includes a receiving unit 210, a determination unit 220, and a repair unit 230.

The receiving unit 210 receives a first behavior vector of all or a portion of the malware from a malware control server 250 connected with the apparatus 200 for repairing the computer system infected by malware via a network 240. The receiving unit 210 may receive any one of a first behavior vector updated in the malware control server 250 from among a plurality of first behavior vectors for malware, and only a portion of a specific first behavior vector, the portion being updated in the malware control server 250, and update the first behavior vector.

The determination unit 220 determines whether a diagnostic target program corresponds to malware based on the received first behavior vector and a second behavior vector for the diagnostic target program.

The receiving unit 210 receives a first behavior vector for malware and a first behavior vector for a normal program. The receiving unit 210 may receive any one of a first behavior vector updated in the malware control server 250 from among a plurality of first behavior vectors for the normal program, and only a portion of a specific first behavior vector, the portion being updated in the malware control server 250, and update the first behavior vector. The determination unit 220 may compare the first behavior vector for the malware, the first behavior vector for the normal program, and the second behavior vector for the diagnostic target program, and determine whether the diagnostic target program corresponds to malware based on a result of the comparison.

The repair unit 230 repairs the computer system based on a result of the determination of the determination unit 220. The repair unit 230 may delete a file infected by malware.

The receiving unit 210 receives a system control signal from the malware control server 250, and the repair unit 230 repairs the computer system based on the received system control signal. The system control signal may indicate to delete the infected file, and to deactivate a communication apparatus related to the diagnostic target program from among communication apparatuses of the computer system.

Generally, the malware invades another computer system via the communication apparatus installed in the specific computer system, such as a Commwarrior virus operated in a Symbian operating system (OS) may invade another computer system via a Bluetooth communication apparatus. As an example, when the Commwarrior virus is detected in the computer system connected with the network 240, the malware control server 250 may transmit the system control signal to the entire computer system connected with the network 240. The apparatus for repairing the computer system infected by the malware that is executed in the computer system receiving the system control signal may deactivate the Bluetooth communication apparatus from among communication apparatuses installed in the computer system. The Commwarrior virus may not invade the other computer system since the Bluetooth communication apparatus is deactivated, and spread of the Commwarrior virus among the computer systems connected with the network 240 may be prevented.

The repair unit 230 may instruct to deactivate a communication apparatus related to the diagnostic target program from among communication apparatuses of the computer system based on the result of the determination of the determination unit 220. When the computer system is infected by the malware, the repair unit 230 may prevent the malware from invading the other computer system and infecting the other computer system.

Figure 3:
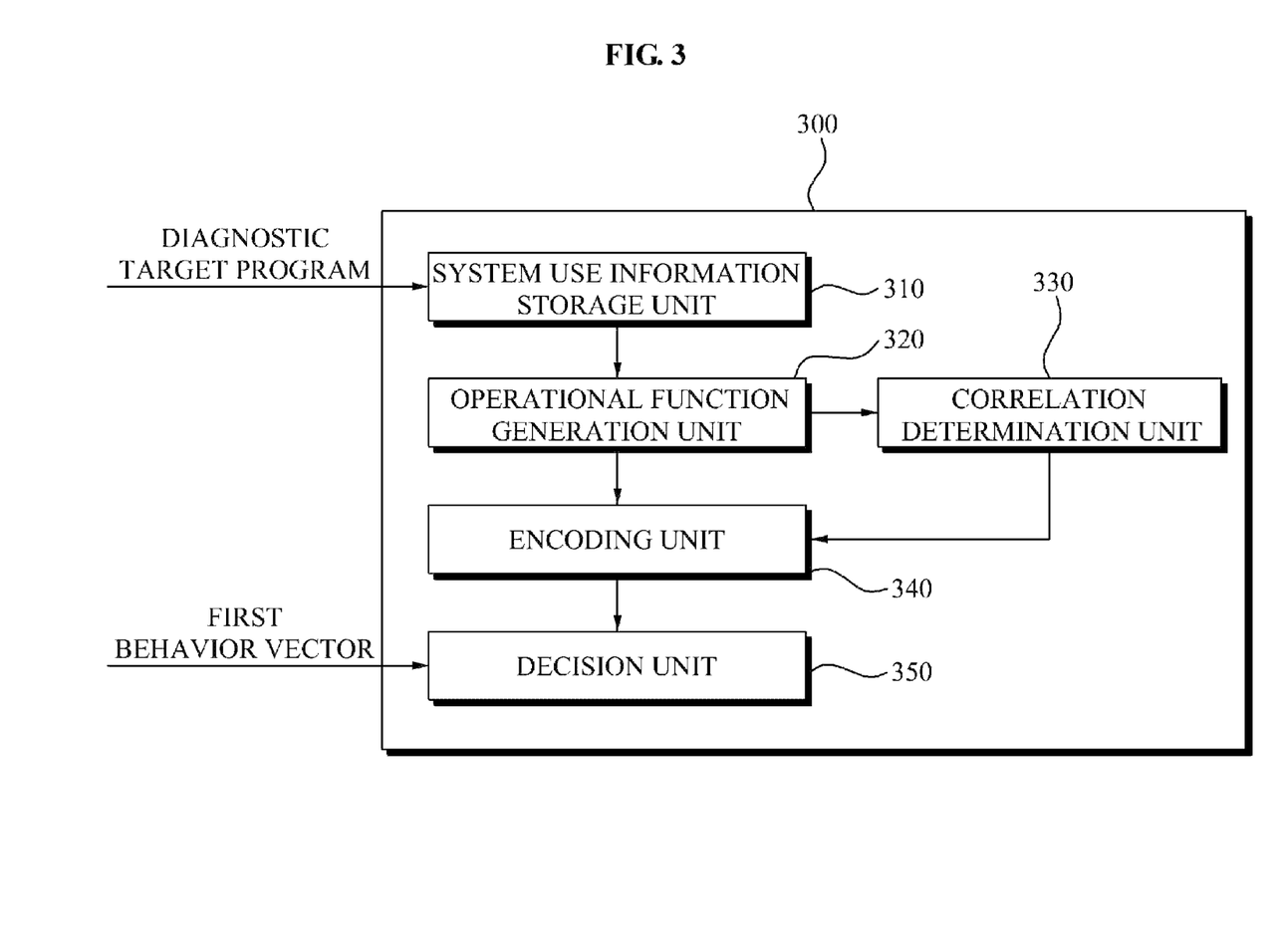
FIG. 3 is a diagram illustrating a structure of a determination unit which determines whether a diagnostic target program corresponds to malware.

FIG. 3 is a diagram illustrating a structure of a determination unit 300 which determines whether a diagnostic target program corresponds to malware. Hereinafter, the structure of the determination unit 300 is described in detail with reference to FIG. 3. The determination unit 300 includes a system use information storage unit 310, an operational function generation unit 320, a correlation determination unit 330, an encoding unit 340, and a decision unit 350.

The system use information storage unit 310 stores a plurality of system use information of the diagnostic target program using a resource of the computer system at different times. The diagnostic target program calls an interface function provided by the computer system, or performs an operation using event generation information of the computer system related to the diagnostic target program. The system use information storage unit 310 may store information that the diagnostic target program calls the specific interface function, information using the event generation information, and the like.

The operational function generation unit 320 generates a plurality of operational functions related to the diagnostic target program based on a correlation between the stored plurality of system use information.

For example, the computer program verifies whether a wireless communication apparatus is installed and is used by another computer program, in order to transmit data to another computer system using the wireless communication apparatus installed in the computer system. Also, the computer program acquires an access authority for the wireless communication apparatus, transmits the data to the wireless communication apparatus, and returns the access authority for the wireless communication apparatus to the computer system again after data transmission is completed.

When a behavior vector of the computer program is extracted by establishing each interface function for performing each above-described operation as a unit, an extraction process is complex. Accordingly, when the correlated system use information is configured as the operational function, and the behavior vector of the computer program is extracted by establishing each operational function as a unit, the extraction process is relatively simplified.

The encoding unit 340 generates the second behavior vector for the diagnostic target program by encoding the generated plurality of operational functions.

A method of determining whether the diagnostic target program corresponds to malware by using the behavior of the diagnostic target program may determine whether the diagnostic target program corresponds to malware after the diagnostic target program performs the specific behavior. Accordingly, when the method is applied to the actual computer system, the behavior vector is generated by modeling the behavior of the diagnostic target program in real time, and whether the diagnostic target program corresponds to malware is quickly determined based on the generated behavior vector.

When the behavior of the diagnostic target program is specified for all system use information stored by the system use information storage unit 310, or all operational functions generated by the operational function generation unit 320, generating the behavior vector in real time is difficult.

The operational function appropriate for specifying the behavior of the diagnostic target program exists from among the plurality of operational functions generated by the operational function generation unit 320, however, an inappropriate operational function also exists. The operational function appropriate for specifying the behavior of the diagnostic target program is generally related to another operational function. When the behavior vector is generated for only the operational function appropriate for specifying the behavior of the diagnostic target program from among the plurality of operational functions generated by the operational function generation unit 320, the behavior vector for the diagnostic target program may be generated in real time.

The malware may copy a program for manipulating the computer system to a directory where system files of the computer system are stored, and the normal program also may copy a file to the directory where the system files of the computer system are stored in order to improve a performance of the computer system. When the computer program simply copies the file to the directory where the system files of the computer system are stored, whether the computer program corresponds to the normal program or malware may not be determined.

However, when the specific computer program copies a received execution file to the system directory of the computer system after receiving the execution file from outside of the computer system, and periodically copies the copied execution file to an external apparatus, the specific computer program may be suspected to be malware. The operational function receiving the file, the operational function copying the file to the system directory, and the operational function copying the file to the external apparatus are correlated, and are appropriate for specifying the behavior of the specific computer program.

The determination unit 300 further includes a correlation determination unit 330 which determines a correlation between the generated plurality of operational functions, and the encoding unit 340 generates the second behavior vector by encoding the plurality of operational functions having the correlation.

When at least one of the plurality of operational functions accesses a system directory of the computer system, the encoding unit 340 generates the second behavior vector for the diagnostic target program.

When a second operational function loads a file generated or modified by a first operational function, the correlation determination unit 330 determines that the first operational function and the second operational function are correlated.

When a second operational function is called based on an execution result of a first operational function, the correlation determination unit 330 determines that the first operational function and the second operational function are correlated.

When the first operational function is executed and the second operational function is called within a predetermined time duration, the correlation determination unit 330 determines that the first operational function and the second operational function are correlated.

The correlation may be determined by targeting only the second operational function executed within the predetermined time duration after the first operational function is executed, in order to generate the behavior vector of the diagnostic target program in real time.

The decision unit 350 decides whether the diagnostic target program corresponds to malware by comparing the first behavior vector for malware and the generated second behavior vector for the diagnostic target program. The decision unit 350 may decide whether the diagnostic target program corresponds to malware by comparing the first behavior vector for the malware, the first behavior vector for the normal program, and the second behavior vector for the diagnostic target program.

Figure 4:
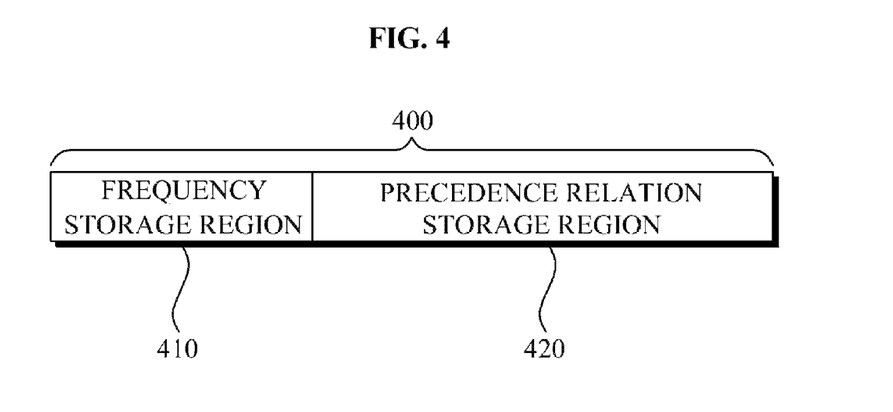
FIG. 4 is a diagram illustrating a behavior vector generated by an encoding unit encoding a plurality of operational functions.

FIG. 4 is a diagram illustrating a behavior vector 400 generated by an encoding unit encoding a plurality of operational functions. Hereinafter, operation of the encoding unit is described in detail with reference to FIG. 4. The behavior vector 400 includes a frequency storage region 410 and a precedence relation storage region 420.

The encoding unit 340 may encode a frequency of each operational function for one life-cycle of the diagnostic target program as the behavior vector of the diagnostic target program.

The life-cycle may be defined as a period of time in which each malware infects a computer system, shows symptoms of malware such as destruction of user data or system data, and infects another computer system.

Malware may call a particular operational function, among all the operational functions that are provided from the computer system, several times in the course of one life-cycle, or may not call another particular operational function even once. Therefore, how frequently the diagnostic target computer program has called the particular operational function in the course of one life-cycle may be determined as the behavior signature of the diagnostic target program.

The behavior vector 400 may include the frequency storage region 410 that stores call frequencies of each operational function called by the diagnostic target program.

The encoding unit 340 may include, in the frequency storage region 410, a plurality of elements which respectively correspond to the plurality of operational functions, and store an execution frequency of the plurality of operational functions in each element.

The encoding unit 340 may generate the behavior vector of the diagnostic target program by encoding the execution frequency associated with how frequently each operational function is called and executed, and the temporal precedence relation between operational functions.

The behavior vector 400 may include the precedence relation storage region 420 that stores the temporal precedence relation between operational functions called by the computer program.

The encoding unit 340 may include, in the precedence relation storage region 420, elements which respectively correspond to combinations of the first operational function and the second operational function, and store, in each element, the temporal precedence relation between the first operational function and the second operational function.

The encoding unit 340 may enable each element storing the temporal precedence relation between the first operational function and the second operational function to have a binary value.

When the first operational function is called before the second operational function, '1' may be stored in the element corresponding to the combination of the functions, and when the first operational function is called after the second operational function, '0' may be stored.

The encoding unit 340 may generate the second behavior vector by encoding only some operational functions from among the plurality of operational functions generated in the course of one life-cycle of the diagnostic target program, and the decision unit 350 may determine whether the diagnostic target program corresponds to malware by comparing the second behavior vector generated by encoding only some operational functions, and the first behavior vector for the malware.

Figure 5:
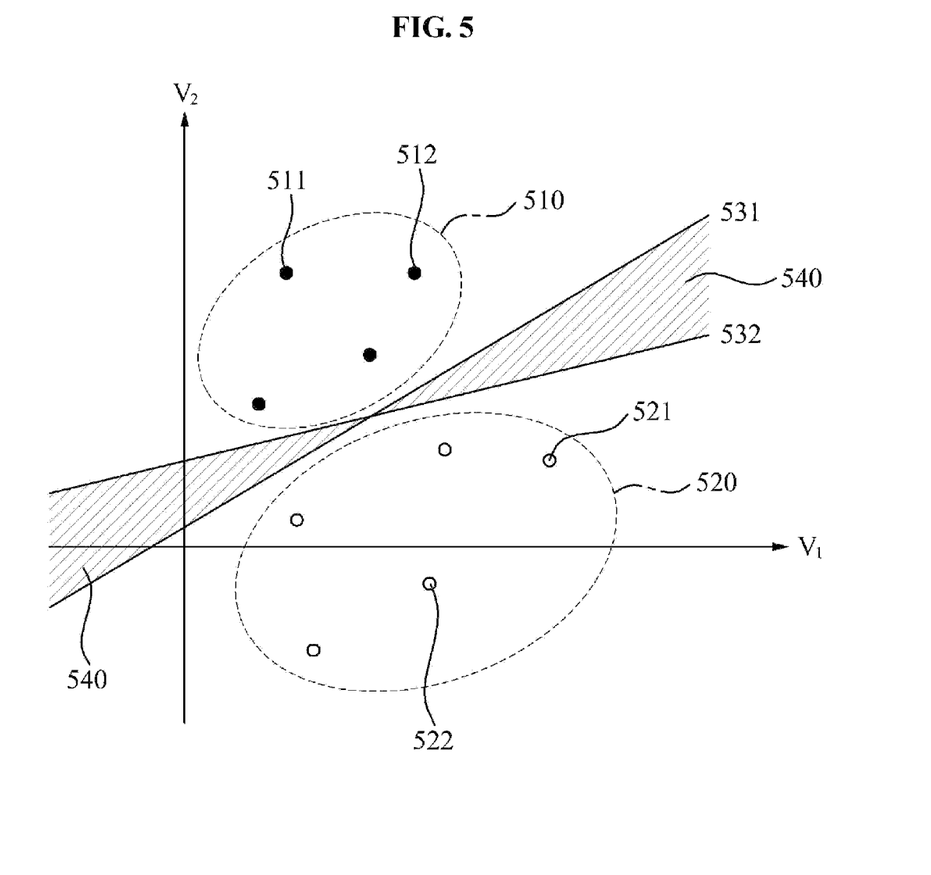
FIG. 5 is a diagram illustrating a determination unit that compares a first behavior vector and a second behavior vector, and determines whether a diagnostic target program corresponds to malware.

FIG. 5 is a diagram that illustrates a determination unit that compares a first behavior vector and a second behavior vector, and determines whether a diagnostic target program corresponds to malware. Hereinafter, operation of the determination unit is described in detail with reference to FIG. 5.

Even though the behavior vectors generated from a normal program, 511 and 512, and behavior vectors generated from the malware, 521 and 522, are located in a two-dimensional behavior vector space, the method may be also applied when a dimension of a behavior vector space is greater than two dimensions.

Behavior signatures extracted from the normal program are relatively similar to each other, and behavior signatures extracted from the malware are relatively similar to each other. However, the behavior signatures extracted from the normal program and the behavior signatures extracted from the malware are significantly different. Accordingly, a normal behavior vector and a malicious behavior vector generated based on each behavior signature extracted from the normal program and the malware are different from each other. The normal behavior vectors 511 and 512, and the malicious behavior vectors 521 and 522 are located in a space classified in the behavior vector space 510 and 520.

Therefore, the apparatus for repairing the computer system infected by the malware classifies the behavior vector space into a normal behavior vector space 510 in which the normal behavior vectors 511 and 512 are located, and a malicious behavior vector space 520 in which the malicious behavior vectors 521 and 522 are located. The apparatus for repairing the computer system infected by malware may determine whether the diagnostic target program corresponds to malware based on a space of the normal behavior vector space 510 and the malicious behavior vector space 520, the space including the behavior vectors 511, 512, 521 and 522 generated from the diagnostic target program.

In the diagnostic target programs corresponding to the behavior vector located in a specific space 540 on the behavior vector space, a result of determining whether the diagnostic target program corresponds to malware may be different based on boundaries 531 and 532 classifying the behavior vector space into the normal behavior vector space 510 and the malicious behavior vector space 520. The boundaries 531 and 532, which accurately determine whether the diagnostic target program corresponding to the behavior vector located in the specific space 540 is malicious, may be selected.

Figure 6:
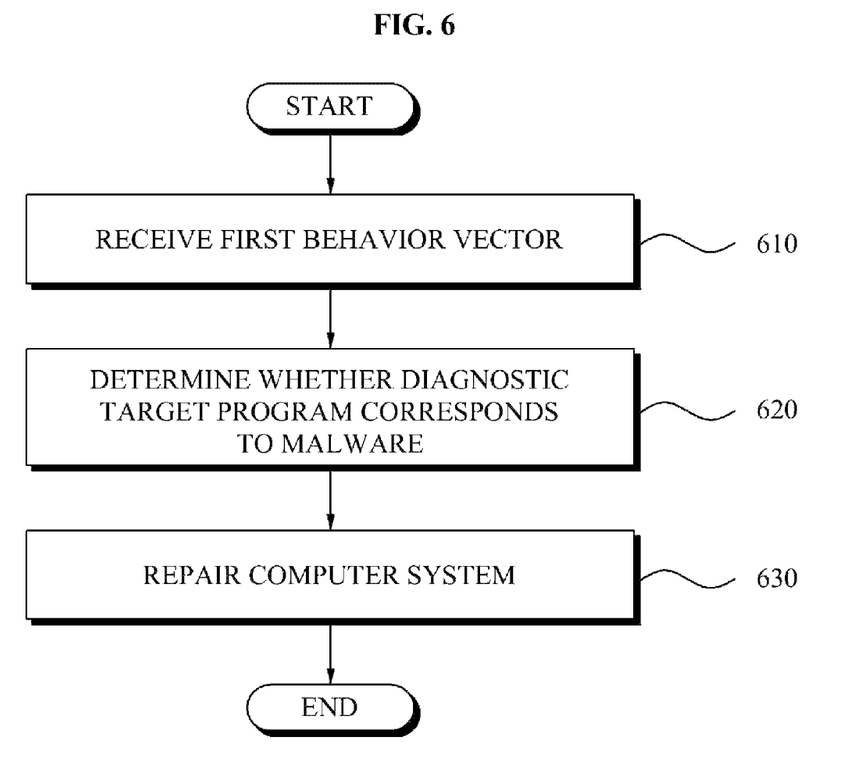
FIG. 6 is a flowchart illustrating a method of repairing a computer system infected by malware.

FIG. 6 is a flowchart illustrating a method of repairing a computer system infected by malware. Hereinafter, the method of repairing the computer system infected by malware is described in detail with reference to FIG. 6.

In operation 610, a first behavior vector for the malware is received from a malware control server. In operation 610, any one of at least one first behavior vector updated in the malware control server from among a plurality of first behavior vectors for the malware, and only a portion of a specific first behavior vector, the portion being updated in the malware control server may be received, and the first behavior vector may be updated. The malware control server is connected with each computer system via a network. A first behavior vector for the malware and a first behavior vector for a normal program may be received in operation 610. Any one of at least one first behavior vector updated in the malware control server from among a plurality of first behavior vectors for the normal program, and only a portion of a specific first behavior vector, the portion being updated in the malware control server, may be received, and the first behavior vector may be updated.

In operation 620, whether a diagnostic target program corresponds to malware is determined based on the received first behavior vector and a second behavior vector for the diagnostic target program. The second behavior vector for the diagnostic target program is generated. Whether the diagnostic target program corresponds to malware may be determined by comparing the first behavior vector for the normal program, the first behavior vector for the malware, and the second behavior vector.

In operation 630, the computer system may be repaired based on a result of the determination in operation 620. When it is determined that the diagnostic target program corresponds to malware, all files infected by the diagnostic target program may be deleted.

When it is determined that the diagnostic target program corresponds to malware, a communication apparatus related to the diagnostic target program may be deactivated from among communication apparatuses of the computer system in operation 630. Only the communication apparatus in which the malware has invaded may be deactivated from among a plurality of communication apparatuses installed in the computer system. Since another communication apparatus is normally used, and only the communication apparatus related to the malware may not be used, a user's inconvenience when using the computer system may be minimized.

Figure 7:
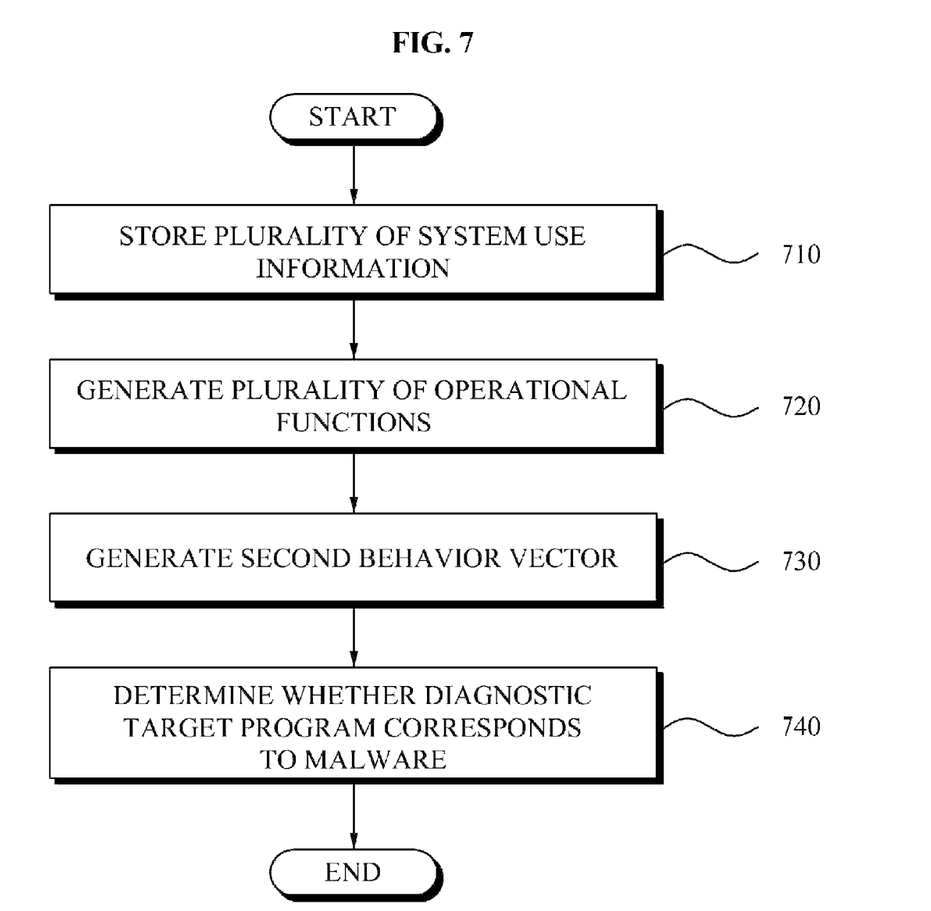
FIG. 7 is a flowchart illustrating a method of determining whether a diagnostic target program corresponds to malware.

FIG. 7 is a flowchart illustrating a method of determining whether a diagnostic target program corresponds to malware. Hereinafter, the method of determining whether the diagnostic target program corresponds to malware is described in detail with reference to FIG. 7.

In operation 710, a plurality of system use information of the diagnostic target program using a resource of the computer system at different times is used. Information that the diagnostic target program calls a specific interface function, information using event generation information, and the like may be stored.

In operation 720, a plurality of operational functions related to the diagnostic target program is generated based on a correlation between the stored plurality of system use information. Each system use information operation of loading a specific file, modifying the file, and storing the file may be regarded as correlated. An operational function modifying the specific file may be generated based on the correlated plurality of system use information, and a behavior of the diagnostic target program may be specified by establishing the generated operational function as a basic unit.

In operation 730, the second behavior vector is generated by encoding the generated plurality of operational functions. The second behavior vector may be generated by determining a correlation between the generated plurality of operational functions, and selecting only the correlated plurality of operational functions. Even though the operational function generated in operation 720 is based on the correlated plurality of system use information, the correlation between the plurality of operational functions may not exist. Since the diagnostic target program performs an operation by sequentially calling the correlated plurality of operational functions, the second behavior vector for the diagnostic target program may be generated by encoding only the correlated plurality of operational functions.

Determining a correlation between the generated plurality of operational functions may be further included and the second behavior vector for the diagnostic target program may be generated by encoding the plurality of operational functions having the correlation based on a result of the determination.

When a second operational function is called based on an execution result of a first operational function, the determining of the correlation determines that the first operational function and the second operational function are correlated.

When a second operational function loads a file generated or modified by a first operational function, the determining of the correlation determines that the first operational function and the second operational function are correlated.

When the first operational function is executed and the second operational function is called within a predetermined time duration, the determining of the correlation determines that the first operational function and the second operational function are correlated. The diagnostic target program may not perpetually collect the system use information of the diagnostic target program using the resource of the computer system in order to determine whether the second operational function related to the first operational function is executed after the first operational function is executed. Accordingly, whether the correlation with the first operational function exists is determined by targeting only the operational function called during a predetermined time after the first operational function is executed.

The malware infects another computer system by copying an execution file to a system directory of the computer system and executing the execution file, or copying the execution file to the other computer system. When there is no operational function accessing the system directory of the computer system from among the plurality of operational functions of the diagnostic target program, the diagnostic target program may be determined as different from malware, and the second behavior vector for the diagnostic target program may not be generated. When at least one of the plurality of operational functions of the diagnostic target program accesses a system directory of the computer system, the second behavior vector for the diagnostic target program may be generated.

In operation 740, whether a diagnostic target program corresponds to malware is determined based on the second behavior vector.

Whether the diagnostic target program corresponds to malware may be determined based on a space in which the second behavior vector for the diagnostic target program is located in a behavior vector space. Since normal behavior vectors generated from system use information of a normal program are relatively similar to each other, the normal behavior vectors are located in a normal behavior vector space on the behavior vector space. Since malicious behavior vectors generated from the system use information are relatively similar to each other, the malicious behavior vectors are located in a malicious behavior vector space on the behavior vector space. When the second behavior vector generated from the system use information of the diagnostic target program is located in the normal behavior vector space, the diagnostic target program is determined to be a normal program. When the second behavior vector generated from the system use information of the diagnostic target program is located in the malicious behavior vector space, the diagnostic target program is determined to be malware.

Figure 8:
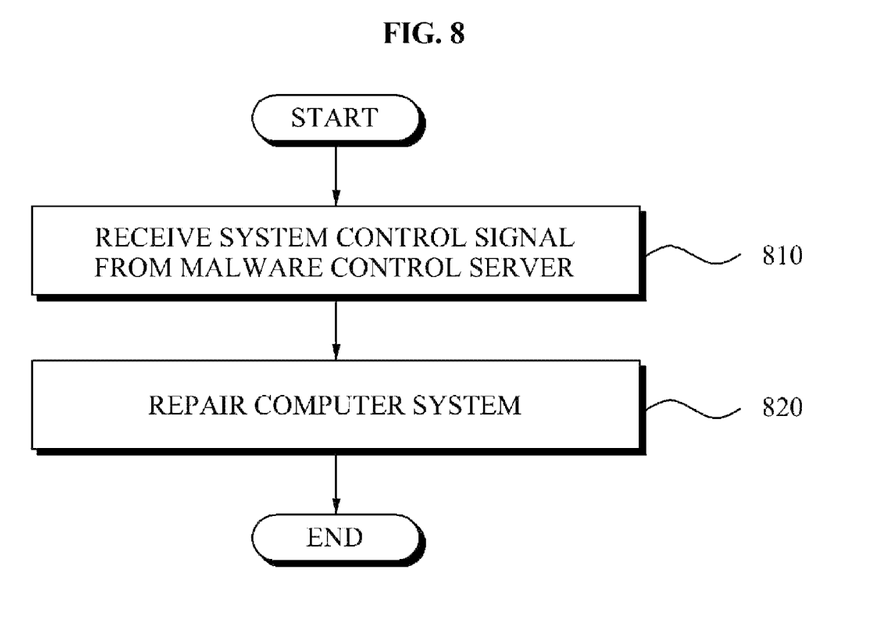
FIG. 8 is a flowchart illustrating another method of repairing a computer system infected by malware.

FIG. 8 is a flowchart illustrating a method of repairing a computer system infected by malware. Hereinafter, the method of repairing the computer system infected by malware is described in detail with reference to FIG. 8.

When the diagnostic target program is determined to be malware, all files related to the diagnostic target program may be deleted.

When the diagnostic target program is determined to be malware, a communication apparatus related to the diagnostic target program may be deactivated from among communication apparatuses of the computer system.

A plurality of communication apparatuses is installed in the computer system, however, the malware generally invades the computer system via a specific communication apparatus from among communication apparatuses of the computer system. When it is determined that the computer system is infected by malware, the malware may be prevented from invading and infecting another computer system by deactivating the communication apparatus related to the malware.

In operation 810, a system control signal may be received from the malware control server.

In operation 820, the computer system is repaired based on the received system control signal.

The malware control server may receive a report from any one of a plurality of computer systems connected via a network that the computer system is infected by specific malware, and transmit, to the plurality of computer systems, the system control signal instructing to alert the plurality of computer systems about the malware. Each computer system may prevent spread of the malware by receiving the system control signal, and deactivating the communication apparatus corresponding to the received system control signal from among communication apparatuses of the computer system.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention. When all or a portion of operations of the apparatus for repairing the computer system infected by malware is embodied in the computer program, computer-readable media storing the computer program are included in the present invention.

According to the above-described exemplary embodiments, an apparatus and method of repairing a computer system infected by malware can model a behavior of a computer program executed in the computer system in real time, and determine whether the computer program corresponds to malware.

According to the above-described exemplary embodiments, there is also an apparatus and method of repairing a computer system infected by malware which can repair the computer system based on a system control signal received from a malware control server, and prevent the malware from being spread when it is determined that a diagnostic target program corresponds to malware.

Although a few exemplary embodiments have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus configured to execute program instructions for repairing a computer system infected by malware, the apparatus comprising:
  a receiving unit configured to receive a first behavior vector characterizing at least one operational function behavior of the malware from a malware control server;
  a determination unit configured to determine whether a diagnostic target program corresponds to malware based on the received first behavior vector and a second behavior vector characterizing at least one operational function behavior of the diagnostic target program; and
  a repair unit configured to repair the computer system based on a result of the determination, and
  a correlation determination unit
    wherein the determination unit comprises:
    a system use information storage unit configured to store a plurality of system use information of the diagnostic target program using a resource of the computer system;
    an operational function generation unit configured to generate one or more operational functions related to the diagnostic target program based on a correlation between the stored system use information; and
    an encoding unit configured to generate the second behavior vector by encoding the generated one or more operational functions,
    and the correlation determination unit configured to determine a correlation between the one or more operational functions, the encoding unit generates the second behavior vector when the one or more operational functions having the correlation,
    wherein the one or more operational functions comprise first operational function and a second operational function, and when the second operational function loads a file generated or modified by the first operational function the second operational function is called based on an execution result of the first operational function or the second operational function is called within a predetermined time duration after the first operational function is called, the encoding unit determines that the first operational function and the second operational function are correlated.

2. The apparatus of claim 1, wherein, the one or more operational functions access a system directory of the computer system, the encoding unit generates the second behavior vector for the diagnostic target program.

3. The apparatus of claim 1, wherein the receiving unit receives a system control signal from the malware control server, and
  the repair unit repairs the computer system based on the received system control signal.

4. The apparatus of claim 1, wherein the repair unit deactivates a communication apparatus related to the diagnostic target program from among one or more communication apparatuses of the computer system based on the result of the determination.

5. A method of repairing a computer system infected by malware, the method comprising:
  receiving a first behavior vector characterizing at least one operational function behavior of the malware;

determining whether a diagnostic target program corresponds to malware based on the received first behavior vector and a second behavior vector characterizing at least one operational function behavior of the diagnostic target program; and repairing the computer system based on a result of the determining, wherein the determining comprises:

storing a plurality of system use information of the diagnostic target program using a resource of the computer system;

generating one or more operational functions related to the diagnostic target program based on a correlation between the stored plurality of system use information;

determining a correlation between the one or more operational functions; and generating the second behavior vector by encoding the generated one or more operational functions when the one or more operational functions having the correlation, wherein the one or more operational functions comprise first operational function and a second operational function, and when the second operational function loads a file generated or modified by the first operational function, the second operational function is called based on an execution result of the first operational function, or the second operational function is called within a predetermined time duration after the first operational function is called, the determining of the correlation determines that the first operational function and the second operational function are correlated.

6. The method of claim 5, wherein, when the one or more operational functions access a system directory of the computer system, the generating of the second behavior vector generates the second behavior vector for the diagnostic target program.

7. The method of claim 5, further comprising:

receiving a system control signal, wherein the repairing repairs the computer system based on the received system control signal.

8. The method of claim 7, wherein the repairing deactivates a communication apparatus corresponding to the received system control signal from among one or more communication apparatuses of the computer system.

9. The method of claim 5, wherein the repairing deactivates a communication apparatus related to the diagnostic target program from among one or more communication apparatuses of the computer system based on the result of the determination.

10. A non-transitory computer-readable recording medium storing a program for implementing a method of repairing a computer system infected by malware, the program including instructions to cause a computer to:

receive a first behavior vector characterizing at least one operational function behavior of the malware;

determine whether a diagnostic target program corresponds to malware based on the received first behavior vector and a second behavior vector characterizing at least one operational function behavior of the diagnostic target program; and repair the computer system based on a result of the determination, wherein the determining comprises:

storing a plurality of system use information of the diagnostic target program using a resource of the computer system;

generating one or more operational functions related to the diagnostic target program based on a correlation between the stored plurality of system use information;

determining a correlation between the one or more operational functions; and generating the second behavior vector by encoding the generated one or more operational functions when the one or more operational functions having the correlation, wherein the one or more operational functions comprise first operational function and a second operational function, and when the second operational function loads a tile generated or modified by the first operational function, the second operational function is called based on an execution result of the first operational function, or the second operational function is called within a predetermined time duration after the first operational function is called, the determining of the correlation determines that the first operational function and the second operational function are correlated.

* * * * *